United States Patent
Takamura et al.

(10) Patent No.: US 7,279,545 B2
(45) Date of Patent: Oct. 9, 2007

(54) PRODUCTION METHOD OF BIODEGRADABLE PLASTIC AND APPARATUS FOR USE IN PRODUCTION THEREOF

(75) Inventors: Takatsugu Takamura, Saitama (JP); Kim Dong Baek, Tokyo (JP); Jyunji Yamada, Chiba (JP)

(73) Assignee: Kabushiki Kaisha J-Corporation, Tokyo (JP)

( * ) Notice: Subject to any disclaimer, the term of this patent is extended or adjusted under 35 U.S.C. 154(b) by 0 days.

(21) Appl. No.: 10/726,652

(22) Filed: Dec. 4, 2003

(65) Prior Publication Data

US 2005/0124782 A1 Jun. 9, 2005

(51) Int. Cl.
*C08G 63/08* (2006.01)

(52) U.S. Cl. .............. 528/271; 528/274; 528/275; 528/283; 528/361

(58) Field of Classification Search .......... 528/271, 528/274, 275, 283, 361
See application file for complete search history.

(56) References Cited

U.S. PATENT DOCUMENTS

| | | | | |
|---|---|---|---|---|
| 4,482,701 A | * | 11/1984 | Yamamori et al. | 528/295.5 |
| 5,108,711 A | * | 4/1992 | Chszaniecki | 422/135 |
| 5,440,008 A | * | 8/1995 | Ichikawa et al. | 528/361 |
| 5,844,068 A | * | 12/1998 | Otera et al. | 528/361 |

* cited by examiner

*Primary Examiner*—Irina S Zemel
(74) *Attorney, Agent, or Firm*—Wenderoth, Lind & Ponack, L.L.P.

(57) ABSTRACT

The present invention provides a production method of biodegradable plastic in which polylactic acid is directly synthesized from lactic acid without employing the conventional route of polylactic acid synthesis from lactic acid via lactide, and apparatus for use in production thereof. In this way, time required for the synthesis of polylactic acid is strikingly shortened and the production cost is reduced. In the production method of biodegradable plastic, polylactic acid, the main component of biodegradable plastic, is obtained by means of condensation polymerization by dehydration of the raw material, lactic acid, under high temperature and reduced pressure in the presence of a metal catalyst.

3 Claims, 3 Drawing Sheets

Lactic acid Lactide Polylactic acid

Lactic acid Polylactic acid

F I G. 4
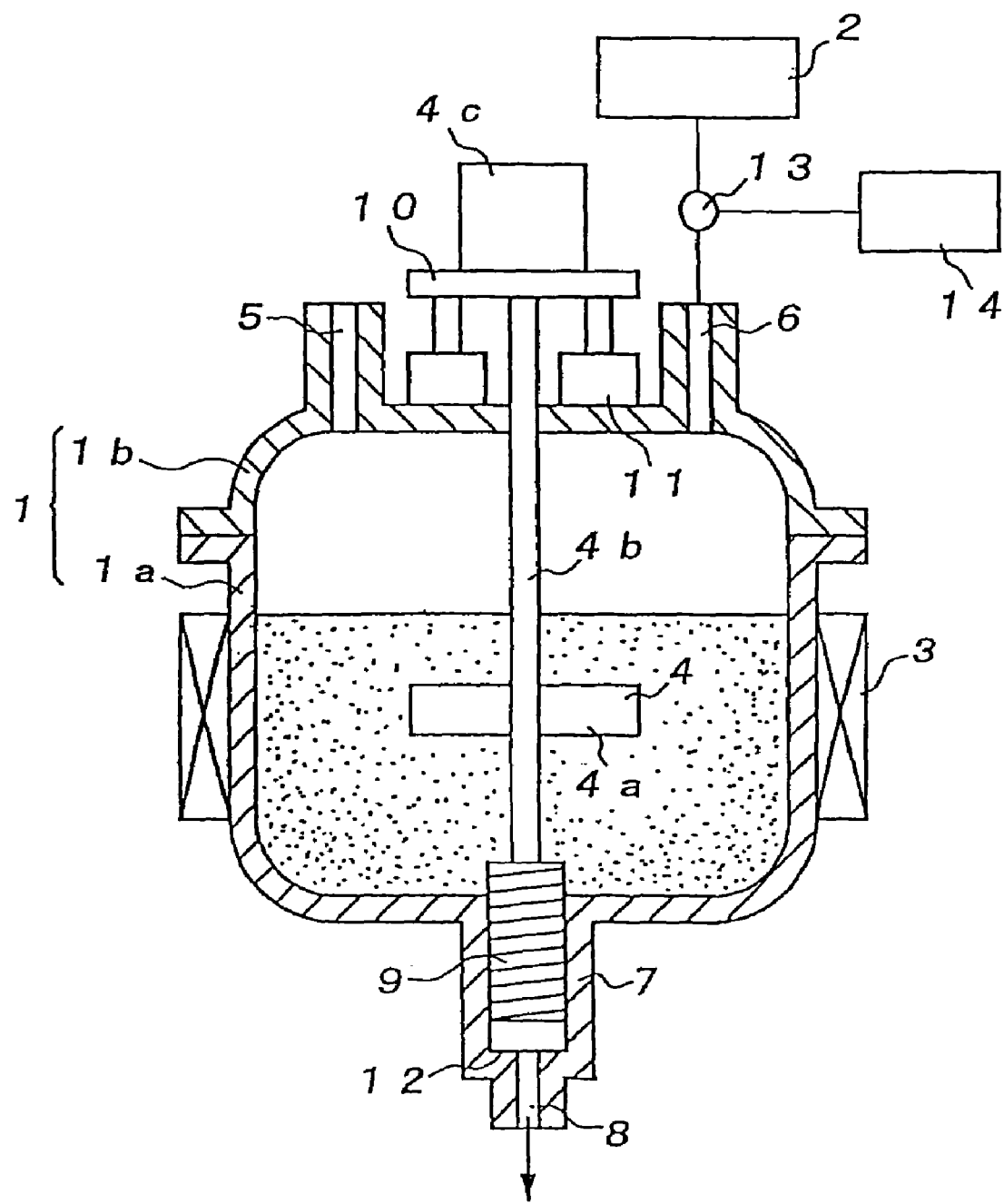

PRODUCTION METHOD OF BIODEGRADABLE PLASTIC AND APPARATUS FOR USE IN PRODUCTION THEREOF

BACKGROUND OF THE INVENTION

The present invention relates to a production method of biodegradable plastic made from lactic acid as a raw material and apparatus for use in the production thereof.

The production method of polylactic acid, a main component of biodegradable plastic, using lactic acid as the raw material is known, and as illustrated in FIG. 1, the conventional method generally consisted of the synthetic process in which lactic acid is converted to polylactic acid via lactide by means of condensation polymerization of lactic acid by dehydration under high temperature and pressure.

Biodegradable plastic is provided with functions and performance as plastic for ordinary use, and is characterized in that the plastic is readily decomposed and rendered harmless in the natural environment when thrown away after use and does not pollute the natural environment. Therefore, the plastic is expected to be used in every field in the near future and is an extremely useful material.

However, the plastic has been used only for compost bags, multi-film used in agriculture and the like since the production cost for the above conventional production method has been high and the plastic had disadvantage such that enough strength and performance could not be attained compared to general-purpose plastic, while it is beginning to be utilized in the field of medicine such as surgical suture owing to its excellent biocompatibility.

BRIEF SUMMARY OF THE INVENTION

The present invention was conceived for the purpose of providing such biodegradable plastic at a low cost, where the process of polylactic acid synthesis from the above lactic acid via lactide is not employed, and a direct synthetic method of polylactic acid from the lactic acid as shown in FIG. 2 and apparatus therefor are provided, thereby strikingly shortening the time required for the synthesis of polylactic acid as well as reducing the cost of production.

BRIEF DESCRIPTION OF THE DRAWINGS

FIG. 4 is a cross sectional view showing the above apparatus in the open state of the discharge outlet.

DETAILED DESCRIPTION OF THE INVENTION

Figure 1:
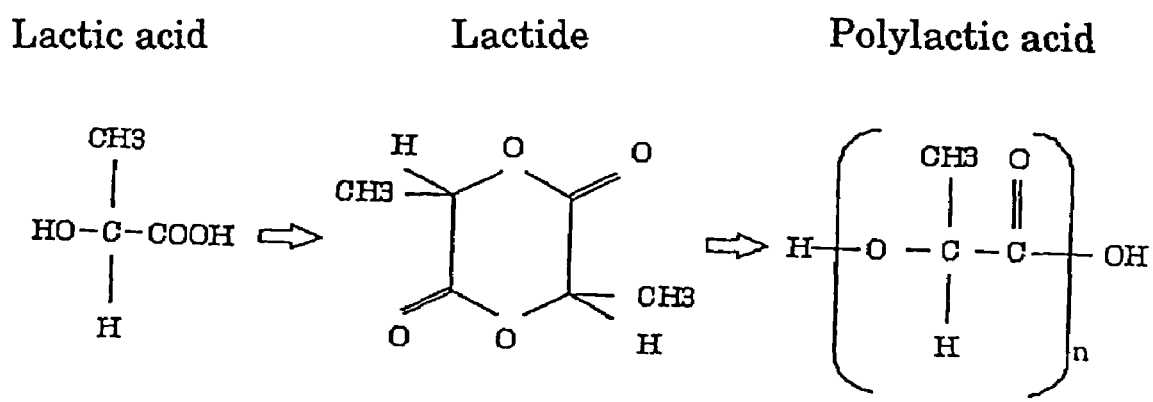
FIG. 1 illustrates chemical formulae showing a conventional synthetic route of polylactic acid.

In this method, lactic acid is obtained by lactic acid fermentation of starch represented by corn starch. Using this lactic acid as a raw material, polylactic acid which is the main component of biodegradable plastic is obtained by means of condensation polymerization of the lactic acid by dehydration under high temperature and pressure in the presence of a metal catalyst.

Water vapor generated during the above condensation polymerization by dehydration is released to the outside of the system and the end point of the reaction is determined by measuring the amount of the released water vapor, thereby obtaining polylactic acid which is the main component of biodegradable plastic.

For the above metal catalyst, zinc chloride or/and stannous chloride is preferred. Namely, using lactic acid as the raw material, polylactic acid which is the main component of biodegradable plastic is obtained by accelerating the above condensation polymerization of the lactic acid by dehydration under high temperature and pressure in the presence of zinc chloride or/and stannous chloride.

In case where zinc chloride and stannous chloride are used in combination as the catalyst, preferably the addition amount of the above zinc chloride is selected from the range of 0.1 to 0.3% by weight and the addition amount of the above stannous chloride is selected from the range of 0.1 to 1% by weight.

Further, the temperature for the above condensation polymerization by dehydration is preferably selected from the range of 180 to 220° C., and the degree of vacuum at the time of the condensation polymerization by dehydration is preferably selected from the range of −0.05 to −0.08 Mpa.

In case of employing the above combination, the condensation polymerization by dehydration reaction may become markedly slow if the total weight of the addition amount of zinc chloride and stannous chloride is below 0.4% by weight. On the other hand, if the total amount exceeds 1% by weight, only the dehydration reaction may proceed, resulting in carbonization of the reactant. In order to avoid this, when the degree of vacuum in the apparatus is enhanced, the condensation polymerization reaction is accelerated, while the formation of lactide is enhanced and such trouble as the decrease of polylactic acid yield may occur.

For this reason, the total addition amount is preferably within the range from 0.4 to 1% by weight when zinc chloride and stannous chloride are used in combination; the addition amount of zinc chloride is preferably within the range from 0.1 to 0.3% by weight; and the addition amount of stannous chloride is preferably within the range from 0.3 to 0.7% by weight.

As specific examples, the weight average molecular weight of polylactic acid was 110,000 when zinc chloride and stannous chloride were used in combination, and zinc chloride and stannous chloride were 0.1% and 0.4% by weight, respectively. And the weight average molecular weight of polylactic acid was 120,000 when zinc chloride and stannous chloride were 0.2% and 0.5% by weight, respectively.

In case where only zinc chloride was used as the catalyst, the addition amount is preferably within the range from 0.2 to 0.8% by weight, and the weight average molecular weight of formed polylactic acid was from 80,000 to 100,000.

In case where only stannous chloride was used as the catalyst, the addition amount is preferably within the range from 0.3 to 1% by weight, and the weight average molecular weight of formed polylactic acid was from 100,000 to 120,000.

When either of these zinc chloride and stannous chloride was used independently, the time necessary for the polymerization was found to become longer. Accordingly, it is possible to use these catalysts independently, if the reaction time is not taken into consideration.

From the above, it was confirmed that the use of zinc chloride and stannous chloride in combination as the catalyst could shorten the polymerization time, make the molecular weight of formed polylactic acid high and increase the yield of polylactic acid.

Next, the apparatus used in the production method of the above biodegradable plastic will be explained based on FIGS. 3 and 4.

This apparatus is provided with an airtight container 1 into which the raw material lactic acid and a metal catalyst are put, a pressure reducing unit 2 which reduces the pressure within the airtight container 1, a heating device 3 which heats the airtight container 1, and a mixing device 4 which mixes the lactic acid in the airtight container 1.

The above airtight container 1, for example, consists of a main body of the container 1a which is open upward and an openable cover body 1b which opens and tightly covers the open part of the main body.

There are provided an inlet 5 for putting in the raw material lactic acid and a catalyst, and a vent 6 connecting to the pressure reducing unit 2, for example, on the top plate of the above container 1, namely the cover body 1b.

Further, the above heating device 3 is formed with an electric heater which contacts the outer peripheral surface of the above main body of the airtight container 1a and is arranged so as to surround the main body 1a.

In addition, there are provided, on the bottom plate of the above airtight container 1, namely on the bottom plate of the main body of the container 1a, a discharge cylinder 7 which is linked to communicate to the inner space of the airtight container 1 in order to discharge synthesized polylactic acid and a product outlet 8 at the outer end of the discharge cylinder 7.

And in the above discharge cylinder 7, a screw shaft 9 is coaxially provided, and the screw shaft 9 allows discharge of polylactic acid in the airtight container 1 through the above product outlet 8 when the outlet 8 is open.

Figure 3:
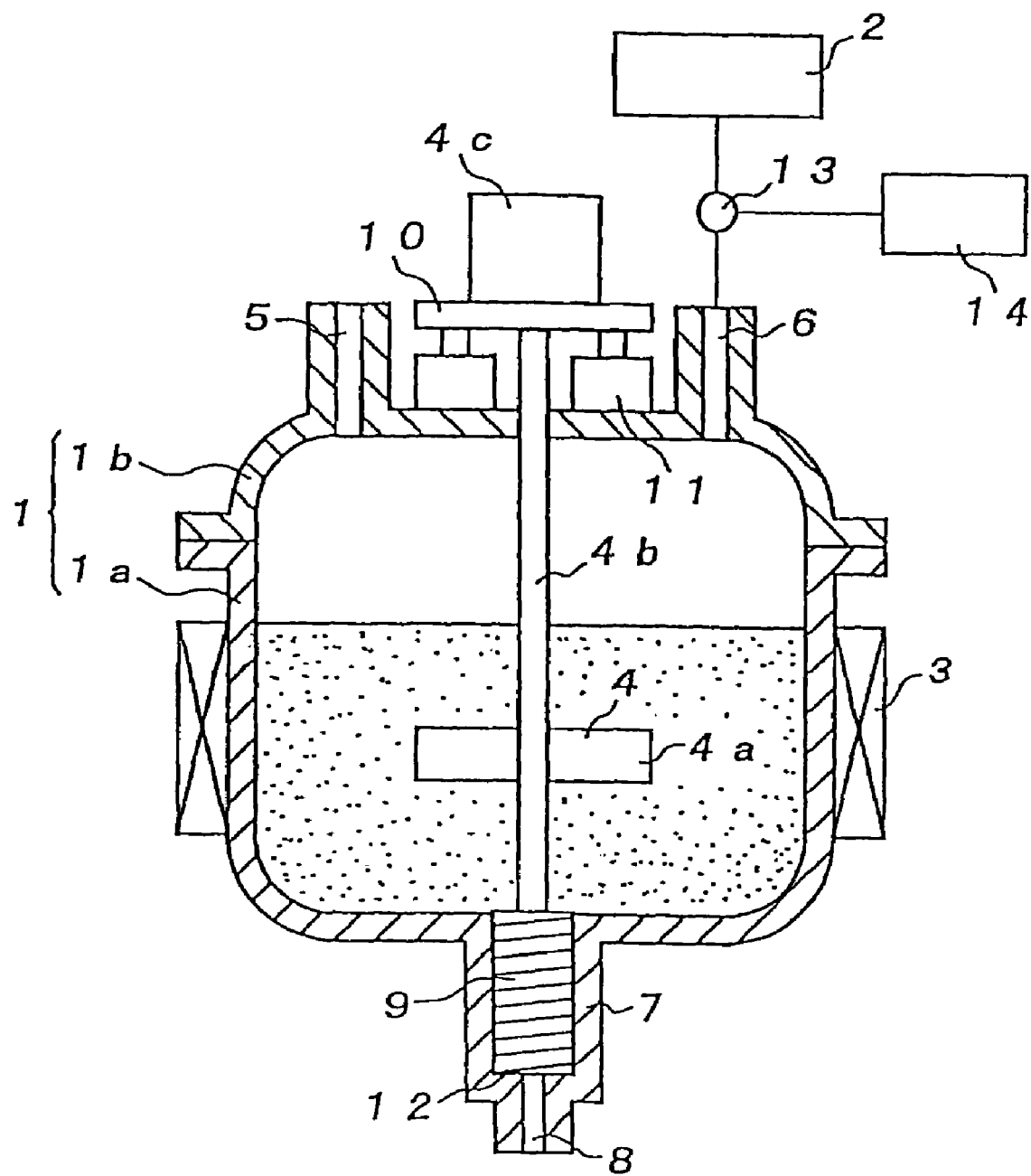
FIG. 3 is a cross sectional view showing apparatus used in the production method of biodegradable plastic of the present invention in the closed state of a discharge outlet.

FIGS. 3 and 4 show the examples of the operational structure of the above screw shaft 9. As shown, the above mixing device 4 is formed with mixing blades 4a, the upper end of an axle 4b of the mixing blades 4a is connected to a motor 4c, and the axle 4b and the mixing blades 4a are rotated by the motor 4c.

The motor 4c is placed on the outside of the airtight container 1, for example, on the upper part of the container top, namely on the upper part of the cover body 1b, and the above axle 4b is directly connected to the driving axle of the motor 4c and arranged vertically at the central part in the airtight container 1.

The lower end of the above axle 4b is provided with the above screw shaft 9 coaxially in a connected row arrangement, and the screw shaft 9 is inserted into the above discharge cylinder 7.

On the other hand, the above motor 4c is supported on a support 10, the support 10 is supported by fluid pressure cylinders 11, and as shown in FIG. 3, the support 10 and motor 4c descend by contraction motion of the fluid pressure cylinders 11, accompanying a descent of the above screw shaft 9 together with the axle 4b and the mixing blades 4a. In other words, the screw shaft 9 is pushed toward the product outlet 8 within the discharge cylinder 7, thereby abutting the end face of the screw shaft 9 against the stage 12 formed at the part connecting to the product outlet 8 and closing the outlet 8.

In the state that the above outlet 8 is closed, the mixing blades 4a are rotated in the forward direction by the motor 4c, the lactic acid in the container is mixed, and the above condensation polymerization by dehydration under high temperature and reduced pressure is accelerated by means of the pressure reducing unit 2 and the heating device 3.

As shown in FIG. 4, the above support 10 and the motor 4c are lifted up by the extension motion of the above fluid pressure cylinder 11, which is accompanied by an upward movement of the above screw shaft 9 together with the axle 4b and mixing blades 4a. That is, the screw shaft 9 is lifted up within the discharge cylinder 7 to be released from the stage 12, thereby liberating the product outlet 8.

In the state that the above outlet 8 is opened, the axle 4b is rotated in the reverse direction by reversing the motor 4c, allowing the screw shaft 9 to counter-rotate. Thus, synthesized polylactic acid is delivered toward the product. outlet 8 and discharged from the same outlet 8.

As mentioned repeatedly, predetermined amounts of lactic acid and catalyst are put into the polymerization apparatus (airtight container 1). While operating the mixing device 4, the inside of the container 1 is reduced in pressure using the pressure reducing unit 2 and at the same time heated up to from 180 to 220° C. by the heating device 3. As the reaction proceeds, water, i.e. water vapor, is generated in the container 1, and this water vapor is released to the outside of the system with the pressure reducing unit 2, thereby allowing the formation of higher proportion of polylactic acid with lower proportion of lactide.

In addition, the progress of the reaction is ascertained by inserting a sensor for water vapor 13 in the middle of the piping to the pressure reducing unit 2 and then measuring the amount of generated water vapor with a measuring device 14, and the reaction is terminated at the time when calculated amount of water vapor is generated.

Thus obtained polylactic acid, the main component of biodegradable plastic, is discharged outside via the above discharge cylinder 7 and the product outlet 8. The method how to recover metal catalyst from this discharged polylactic acid is based on the known art.

Figure 2:
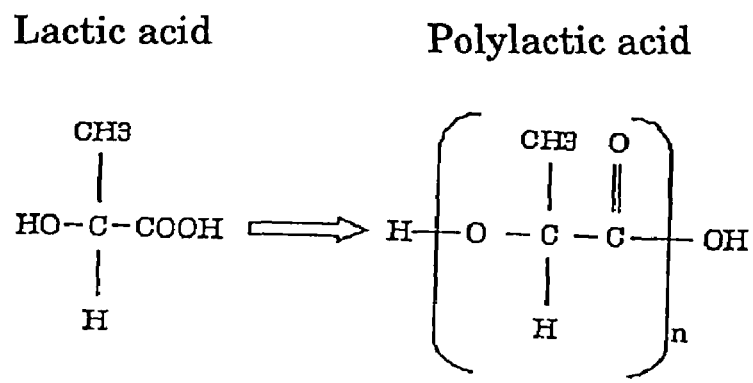
FIG. 2 illustrates chemical formulae showing a synthetic route of polylactic acid according to the present invention.

According to the present invention, polylactic acid can be synthesized directly from the above lactic acid as shown in FIG. 2, without employing the conventional route in which polylactic acid is synthesized from lactic acid via lactide as shown in FIG. 1, and therefore, time required for the synthesis of polylactic acid is strikingly shortened and the production cost is reduced.

Further, the reaction time is saved by about 50% compared with that in conventional polymerization methods as well as polylactic acid with high quality is obtained without carbonization of the product even if the heating temperature varies to a certain degree because the partial pressure of oxygen is low in the polymerization apparatus.

Explanation of Letters and Numerals
1 Airtight container
1a Main body of container
1b cover body
2 pressure reducing unit
3 heating device
4 mixing device
4a mixing blade
4b axle
4c motor
5 Inlet for lactic acid and catalyst
6 Vent
7 Discharge cylinder
8 Product outlet
9 Screw shaft
10 Motor support
11 Fluid pressure cylinder 12 Stage
13 Sensor for water vapor
14 Measuring device for water vapor

We claim:

1. A production method of biodegradable plastic comprising:

providing lactic acid as a raw material;

subjecting the lactic acid to condensation polymerization by dehydration under high temperature and reduced pressure in the presence of a combination of zinc chloride and stannous chloride wherein the amount of the zinc chloride is from 0.1 to 0.3% by weight based upon the amount of lactic acid provided as a raw material and the amount of the stannous chloride is from 0.4 to 1% by weight based upon the amount of lactic acid provided as a raw material; and obtaining polylactic acid that is a main component of the biodegradable plastic.

2. A production method of biodegradable plastic comprising:

providing lactic acid as a raw material;

subjecting the lactic acid to condensation polymerization by dehydration under high temperature and reduced pressure in the presence of a combination of zinc chloride and stannous chloride wherein the amount of the zinc chloride is from 0.1 to 0.3% by weight based upon the amount of lactic acid provided as a raw material and the amount of the stannous chloride is from 0.4 to 1% by weight based upon the amount of lactic acid provided as a raw material;

releasing water vapor generated during the condensation polymerization by dehydration to the outside of the system;

determining the end point of the reaction by measuring the released amount of the water vapor concurrently with the release thereof; and obtaining polylactic acid that is a main component of the biodegradable plastic.

3. The production method of biodegradable plastic according to claim 1 or 2, wherein the temperature of the condensation polymerization by dehydration is from 180 to 220° C. and the degree of vacuum at the time of the condensation polymerization by dehydration is from —0.05 to —0.08 Mpa.

* * * * *